Feb. 17, 1931.   F. McMAHON   1,793,112
ANGLE PLATE
Filed April 5, 1929
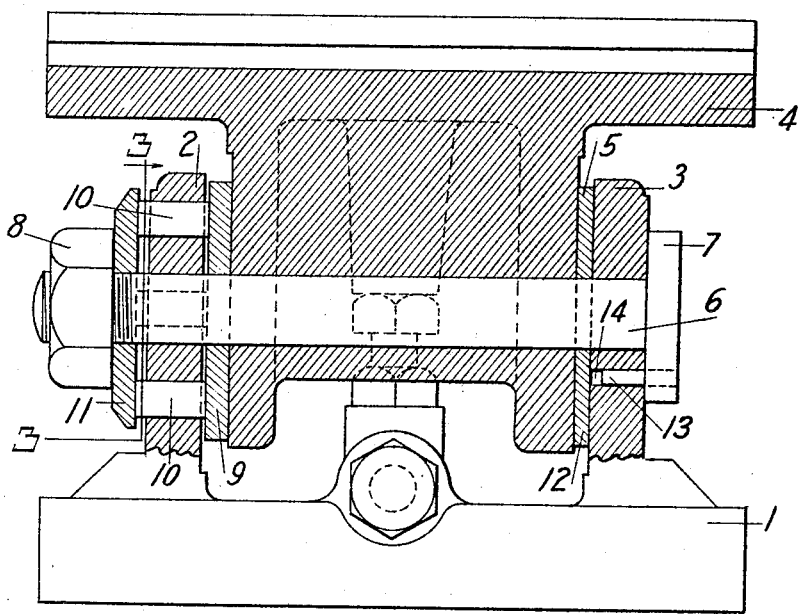
Fig. 2.
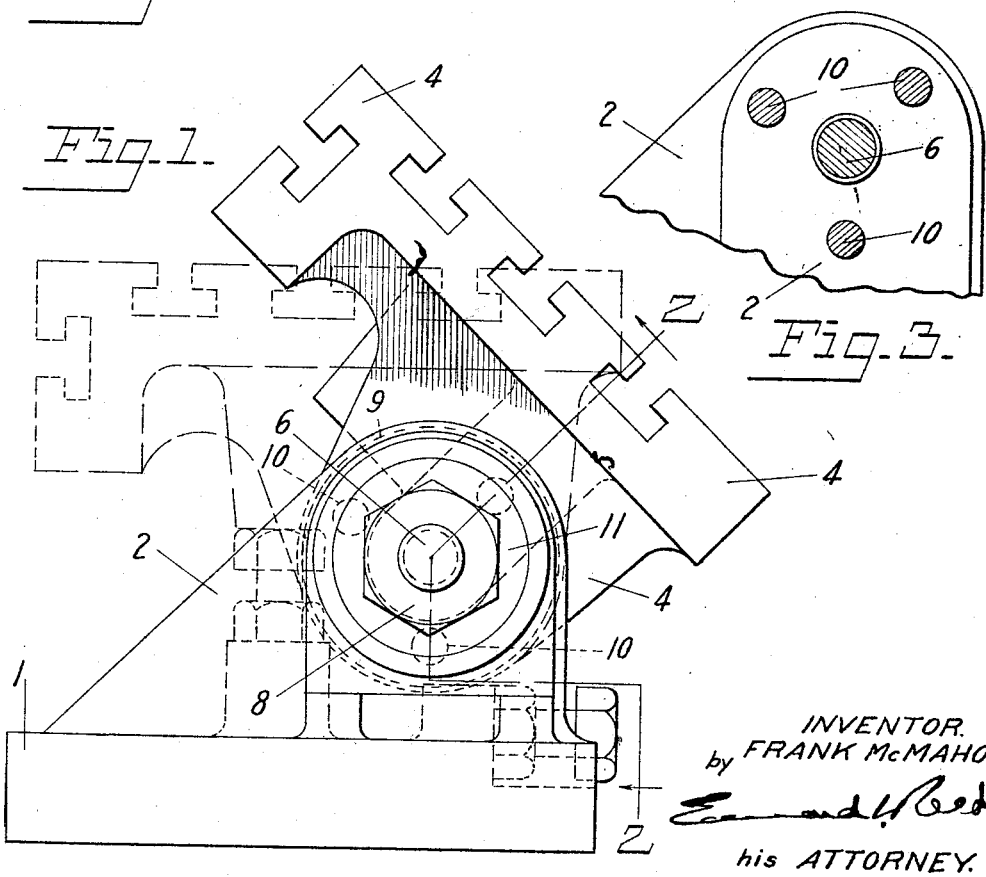
Fig. 1.
Fig. 3.
INVENTOR.
by FRANK McMAHON
his ATTORNEY.

Patented Feb. 17, 1931

1,793,112

UNITED STATES PATENT OFFICE

FRANK McMAHON, OF DAYTON, OHIO

ANGLE PLATE

Application filed April 5, 1929. Serial No. 352,887.

This invention relates to angle plates and the like and more particularly to means for rigidly securing an angle plate in adjusted positions. Angle plates of the type here contemplated are commonly employed by tool makers and other mechanics to support the work in a definite position while certain operations are being performed thereon, and it is important that means should be provided for rigidly securing the plate in finely adjusted positions and that the means for securing the plate in its adjusted positions should be of such a character that the operation thereof will not cause the plate to be displaced to the slightest degree with relation to its supporting structure.

One object of the present invention is to provide simple and efficient means for rigidly securing the angle plate in adjusted positions.

A further object of the invention is to provide means for so securing the angle plate without displacing the same or throwing any of the parts out of alinement.

Other objects of the invention will appear as the device is described in detail.

In the accompanying drawings Fig. 1 is an end elevation of a device embodying my invention; Fig. 2 is a sectional view taken on the line 2—2 of Fig. 1; and Fig. 3 is a detail section taken on the line 3—3 of Fig. 2.

In these drawings I have illustrated one embodiment of the invention and have shown the same as applied to an angle plate of a known type but it will be understood that this particular embodiment has been chosen for the purpose of illustration only and that the invention may take various forms and may be applied to adjustable devices of various kinds.

In the particular construction here illustrated, the device comprises a supporting structure consisting of a base 1 and a pair of upwardly extending pivot lugs 2 and 3. The angle plate 4 has a downwardly extending portion or bearing 5 arranged between and supported by the lugs 2 and 3 of the base. A pivot pin 6 extends through the pivot lugs and the bearing to pivotally connect the angle plate with the supporting structure. In the present instance, the pivot pin is in the form of a bolt having at one end a head 7 which engages the outer face of the pivot lug 3 to limit the axial movement of the pivot pin in one direction and having at its other end a nut 8 arranged on the outer side of the pivot lug 2.

The bearing 5 of the angle plate is of a length slightly less than the distance between the two pivot lugs and may, if desired, be capable of a limited axial movement with relation to the supporting structure. A clamping member 9 is interposed between one of the pivot lugs, in the present instance the lug 2, and the adjacent end of the bearing and, as here shown, this clamping member is in the form of a disk mounted on the pivot pin and adapted to have frictional contact with the end of the bearing. Means are mounted on the pivot lug 2 for transmitting movement to the clamping member to cause the same to frictionally engage the end of the bearing. Preferably this means is in the form of members, such as pins 10, slidably mounted in the bearing lug in line with the friction disk 9 and of such a length that they may extend beyond both sides of the lug. Carried by the pivot pin on the outer side of the lug is a part adapted to engage the outer ends of the pins 10 and move the same and the friction disk toward the bearing. In the present construction this part is in the form of a plate or disk 11 slidably mounted on the pivot pin between the lug 2 and the nut 8 and of such a diameter that it will engage the outer ends of the several pins 10, these pins being preferably spaced substantially equal distances about the axis of the pivot pin. When the nut 8 is tightened down on the pivot pin or bolt 6 the plate 11 will force the pins and the clamping disk toward the end of the bearing and, in the present construction, will impart a slight axial movement to the bearing to cause the other end thereof to be clamped with relation to the other pivot lug 3. As here shown, a disk 12 is interposed between the lug 3 and the adjacent end of the bearing but this disk is employed primarily for the purpose of simplifying production and is not essential to the operation of the device. While I have here shown a separate disk 11 for actuating the connecting members or pins 10 it will be obvious that if the bolt 6 were reversed the head 7 might be made of sufficient diameter to engage the pins and actuate the friction member when the nut is tightened down against the other pivot lug.

In the present device the head 7 of the bolt is provided with a pin 13 which extends into an opening 14 in the pivot lug 3 and holds the bolt against rotation in the pivot lugs, the bearing turning on the bolt. It will be obvious, however, that it is immaterial to the operation of the invention whether the bolt turns in the pivot lugs or the bearing turns on the bolt.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device of the character described, a supporting structure having pivot lugs spaced apart, an adjustable member having a bearing arranged between and pivotally supported by said lugs and mounted for limited axial movement with relation to said lugs, a clamping member interposed between said bearing and one of said lugs, and means acting on said clamping member to move the same into engagement with the adjacent end of said bearing and to move said bearing toward the pivot lug at the other end thereof.

2. In a device of the character described, a supporting structure having pivot lugs spaced apart, an adjustable member having a bearing arranged between and pivotally supported by said lugs, a clamping member interposed between said bearing and one of said lugs, and means supported by said lug and having a part on the outer side of said lug to press said clamping member into engagement with said bearing.

3. In a device of the character described, a supporting structure having pivot lugs spaced apart, an adjustable member having a bearing arranged between said lugs, a pivot pin to support said bearing on said lugs, a clamping member interposed between said bearing and one of said lugs, and means connected with said pivot pin on the outer side of said lug and acting on said clamping member to move the latter toward said bearing and to move said bearing toward the other lug.

4. In a device of the character described, a supporting structure having pivot lugs spaced apart, an adjustable member having a bearing arranged between said lugs, a pivot pin to support said bearing on said lugs, a clamping member interposed between said bearing and one of said lugs, actuating means movably mounted on said pivot pin on the outer side of said lug, and means movably mounted on said lug to operatively connect said actuating means with said clamping member.

5. In a device of the character described, a supporting structure having pivot lugs spaced apart, an adjustable member having a bearing arranged between said lugs, a pivot pin to support said bearing on said lugs, a clamping member interposed between said bearing and one of said lugs, pins slidably mounted in said lug in line with said clamping member, a plate slidably mounted on said pivot pin on the outer side of said lug and arranged to engage the pins in said lug, and a nut on said pivot pin on the outer side of said plate to cause the latter to press said pins and said clamping member toward said bearing.

6. In a device of the character described, a supporting structure having pivot lugs spaced apart, an adjustable member having a bearing arranged between said pivot lugs, a pivot pin extending through said lugs and said bearing and having a part to engage one of said lugs and hold said pin against axial movement in one direction, a friction member interposed between said bearing and the other of said lugs, and means connected with said pivot pin on the outer side of the last mentioned lug and acting on said friction member to press the latter against said bearing.

7. In a device of the character described, a supporting structure having pivot lugs spaced apart, an adjustable member having a bearing arranged between said pivot lugs, a pivot pin extending through said lugs and said bearing and having a part to engage one of said lugs and hold said pin against axial movement in one direction, a friction member interposed between said bearing and the other of said lugs, connecting members movably mounted on the last mentioned lug, and means connected with said pivot pin on the outer side of said last mentioned lug to cause said connecting members to press said friction member against said bearing.

8. In a device of the character described, a supporting structure having pivot lugs spaced apart, an adjustable member having a bearing arranged between said pivot lugs, a pivot pin extending through said lugs and said bearing and having a part to engage one of said lugs and hold said pin against axial movement in one direction, a friction member interposed between said bearing and the other of said lugs, connecting members movably mounted on the last mentioned lug, a part slidably mounted on said pivot pin on the outer side of the last mentioned lug and arranged to engage said connecting members, and means connected with said pivot pin to draw the first mentioned part thereof against the adjacent lug and to cause said slidable part to move said connecting members and said friction member toward said bearing.

9. In a device of the character described, a supporting structure having pivot lugs spaced apart, an adjustable member having a bearing arranged between said pivot lugs, a pivot pin extending through said lugs and said bearing and having a part to engage one of said lugs and hold said pin against axial movement in one direction, a friction member interposed between said bearing and the other of said lugs, pins slidably mounted in the last mentioned lug in line with said friction member, a plate movably mounted on said pivot pin on the outer side of said last mentioned lug and arranged to engage said pins, and a nut on said pivot pin on the outer side of said movable plate.

10. In a device of the character described, a supporting structure having bearing lugs spaced apart, an adjustable member having a bearing arranged between said lugs, a pivot pin extending through said lugs and said bearing, a clamping member interposed between said bearings and one of said lugs, connecting members movably mounted on said lug and having operative connection with said clamping member, a part carried by said pivot pin to actuate said connecting members, and means connected with said pivot pin to impart movement to said part.

11. In a device of the character described, a supporting structure having bearing lugs spaced apart, an adjustable member having a bearing arranged between said lugs, a pivot pin extending through said lugs and said bearing, a clamping member interposed between said bearings and one of said lugs, pins slidably mounted in said lug in line with said clamping member, a part carried by said pivot pin and arranged to engage the outer ends of the pins in said lug, and a nut on said pivot pin to cause said part to move said pins and said clamping member toward said bearing.

12. In a device of the character described, a supporting structure having pivot lugs spaced one from the other, an adjustable member having a single bearing arranged between and pivotally supported on said lugs and mounted for a limited axial movement with relation to said lugs, and means arranged on the outside of one of said lugs and acting on the adjacent end of said bearing to force said bearing toward the other lug.

13. In a device of the character described, a supporting structure having pivot lugs spaced one from the other, an adjustable member having a single bearing arranged between said lugs, a pivot pin to support said bearing on said lugs, members slidably mounted on one of said lugs and arranged to act on said bearing to force the same toward the other lug, and means carried by said pivot pin on the outer side of the first mentioned lug to actuate said members.

In testimony whereof, I affix my signature hereto.

FRANK McMAHON.